United States Patent [19]

Rinelli et al.

[11] 4,191,729

[45] Mar. 4, 1980

[54] HYDROMETALLURGICAL PROCESS FOR SEPARATING LEAD AND ZINC FROM OXIDIZED ORE

[75] Inventors: Giorgio Rinelli; Carlo Abbruzzese, both of Rome, Italy

[73] Assignee: Consiglio Nazionale delle Ricerche, Rome, Italy

[21] Appl. No.: 936,386

[22] Filed: Aug. 24, 1978

[30] Foreign Application Priority Data

Aug. 26, 1977 [IT] Italy ................................ 84142 A/77

[51] Int. Cl.$^2$ ............................................ C01G 21/00
[52] U.S. Cl. ...................................... 423/98; 423/101
[58] Field of Search ................ 423/98, 100, 109, 101; 75/103, 120

[56] References Cited

U.S. PATENT DOCUMENTS

| | | | |
|---|---|---|---|
| 3,954,450 | 5/1976 | Kuhn et al. | 75/103 |
| 3,971,652 | 7/1976 | Bryson | 423/24 |

*Primary Examiner*—O. R. Vertiz
*Assistant Examiner*—Wayne A. Langel
*Attorney, Agent, or Firm*—D. Paul Weaver

[57] ABSTRACT

A process for separating lead and zinc from oxidized ore is disclosed. The process is directed to the ammoniacal leaching of the ore in the presence of the anions of polycarboxylic acids, particularly sodium tartrate, and the subsequent selective extraction by means of complex-producing solvents.

15 Claims, 6 Drawing Figures

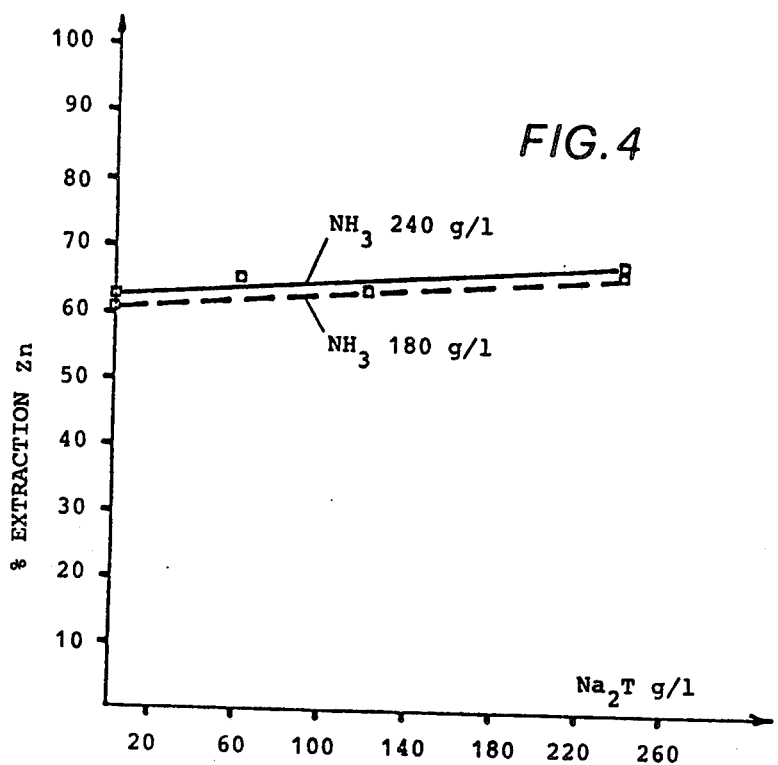
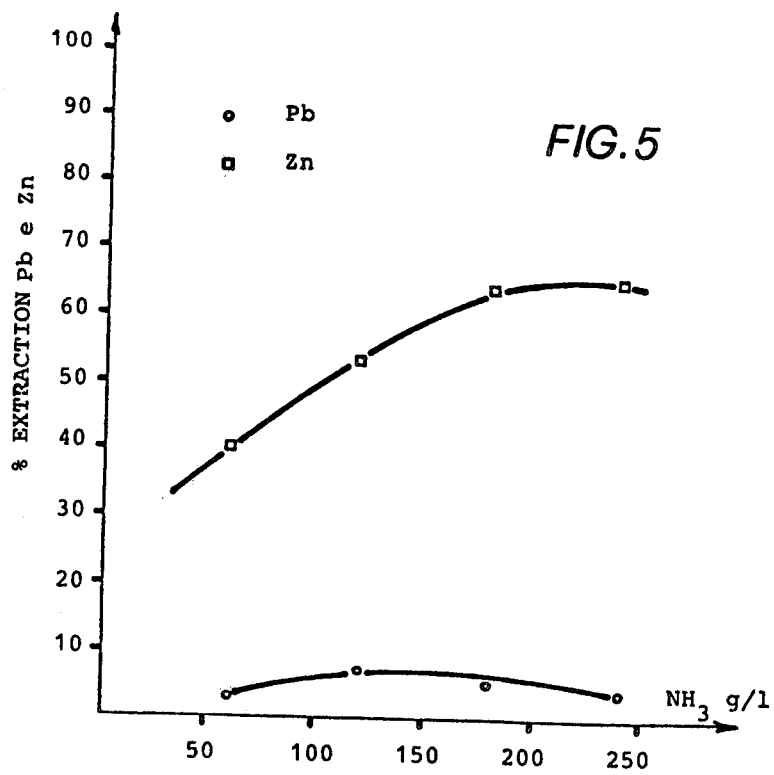

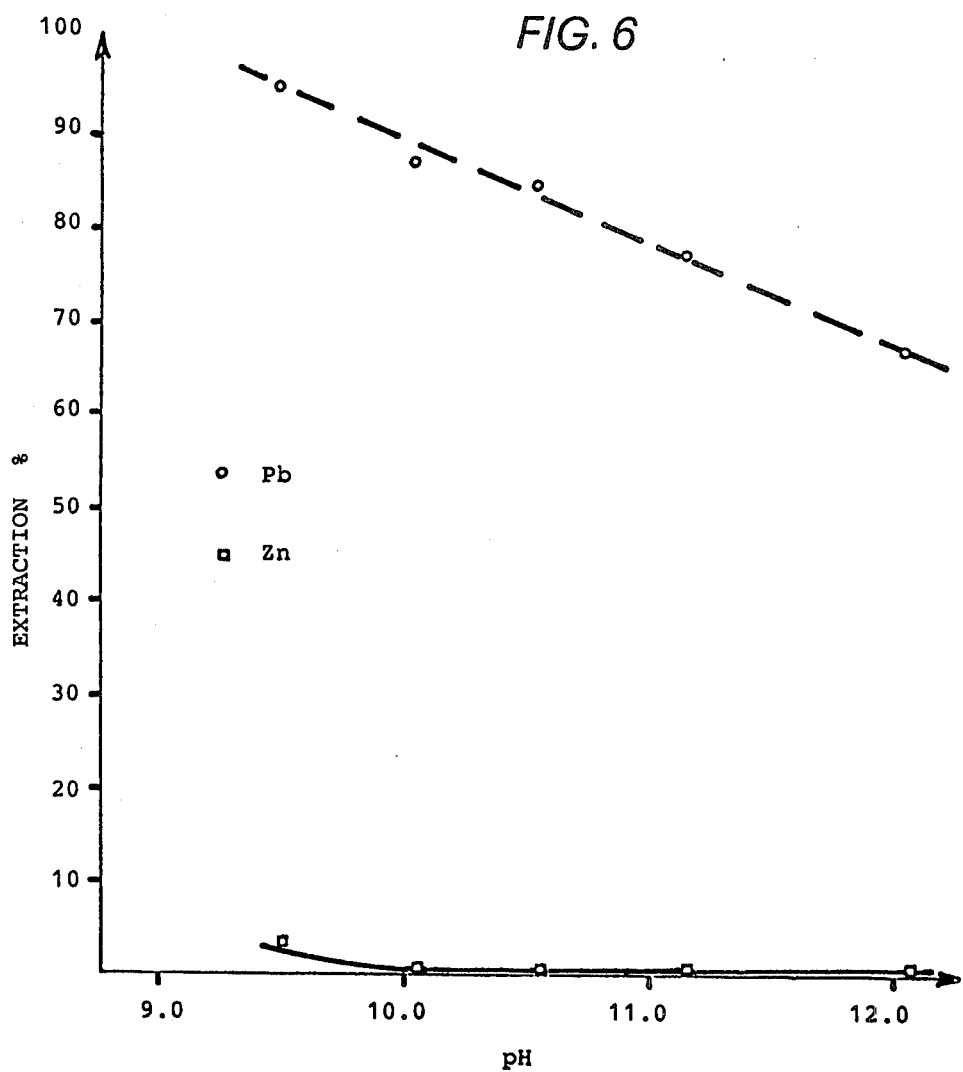

HYDROMETALLURGICAL PROCESS FOR SEPARATING LEAD AND ZINC FROM OXIDIZED ORE

The present invention relates to a hydrometallurgical process for selectively separating lead and zinc from oxidized ore.

The process for selectively separating lead and zinc from oxidized ore, by means of alkaline solution leaching, is well known. In such a process, however, because both metals are dissolved as anions ($ZnO_2^{-2}$ and $PbO_2^{-2}$), the subsequent separation of the two elements is very difficult and only obtainable through selectively-acting anionic extractors.

A process involving leaching with an ammoniacal solution and the subsequent solvent-extraction of such metallic ions, forming amino-complexes (Co, Ni, Zn, Cu) and utilizing differences in the thermodynamic and kinetic characteristics (pH, extraction speed, etc.) is also known. This process, however, which would imply the use of chelating agents in the subsequent selective extraction, has never been used in the case of lead and zinc ore, since the lead does not dissolve during the ammoniacal leaching but remains in the solid residuum.

An object of the present invention is to provide a process for selectively separating lead and zinc from oxidized ore, which overcomes the known shortcomings of the above noted processes and to widen the field of application of the chelating agents.

In accordance with the present invention the foregoing and further objects are achieved by a process involving the hydrometallurgical selective separation of lead and zinc from oxidized ore which comprises the ammoniacal leaching of such ores in the presence of the anions of polycarboxylic acids and the subsequent selective extraction by means of complex-producing solvents.

With reference to still further details of the invention, tartrate ions may be used and particularly suitable for use as the anions of the polycarboxylic acid. As to be discussed and defined hereinbelow, LIX-64N may be used in the ammoniacal solution as a Pb complex-producing solvent with respect to Zn.

The present invention will be further illustrated in particular preferred embodiments and experimental examples, which are expressly intended as non-limitative, and with reference to the accompanying tables and drawings, wherein:

FIG. 4 shows the Zn solubility curve according to the concentration of sodium tantrate, during the same stage of ammoniacal leaching;

FIG. 5 illustrates, as a comparison, the solubility curve of both metals, in the ammoniacal leaching, without sodium tantrate, and FIG. 6 shows the curve of Pb recovery, depending upon the pH of the waterly phase in the process of Pb extraction in organic phase with LIX-64N.

The process of the invention may be carried out in a plant which comprises a conventional leaching tank 1 provided with an agitator 2. A conventional extractor 3, preferably of the column type, is also employed.

In carrying out the process, the ore to be treated (M) is introduced into the tank, and submitted to a leaching with a water solution of ammonia and a salt of a polycarboxylic acid, e.g. citric or tartaric acid. In the case of the tartaric acid, the salt of the carboxylic acid (i.e. sodium tartrate $Na_2T$) is used.

During leaching, which is carried out at a pH in the range of about 11.5–12.5, the zinc ore, mainly consisting of carbonates, reacts with ammonia, in accordance with the following reactions:

During leaching, the Pb (also contained in the ore, mainly as a carbonate) in the presence of tartrate ions, is dissolved as a complex, either as a basic salt or as a lead-bitartrate anion, in accordance with the following reaction:

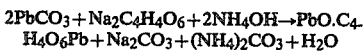

It may be observed that, under such conditions, the iron too, (the only metal generally abundant in the ore) may be dissolved as ammoniacal tartrate. The latter, however, under the influence of both temperature and strong basic environment, (pH 12) is subsequently hydrolyzed and Fe precipitates as a basic salt of the type $Fe_2(C_4H_4O_6)_3.Fe_2O_3.6H_2O$.

To limit the $NH_3$ volatilization losses, the leaching process is preferably carried out at a temperature up to about 50° C. At its conclusion the pulp is filtered and the residuum is washed with warm ammoniacal solution. The ammoniacal solution thus obtained is then introduced into the extractor to realize the selective Pb extraction in the organic phase. During this stage the water phase consists of the ammoniacal solution, to which $H_2SO_4$ has been added to bring the pH to a level of about 9–10. On the other hand the organic phase consists of a kerosene solution of LIX-64N. The latter product, as is well known (cf. R. L. Atwood, J. D. Miller: "Structure and composition of commercial chelate extractants." Trans.Soc. Mining Eng. AIME, 254, 4, pages 319–323 (1973) is a mixture of β-hydroxybenzophenonoxyme (LIX-65N) and β-hydroxy-alkyloxyme (LIX-63), commercially produced by General Mills.

During the organic phase extraction process, the LIX-64N forms $Pb^{+2}$ chelates, but does not react with the Zn, which is already dissolved as a stable complex $Zn(NH_3)_4^{+2}$.

Figure 1:
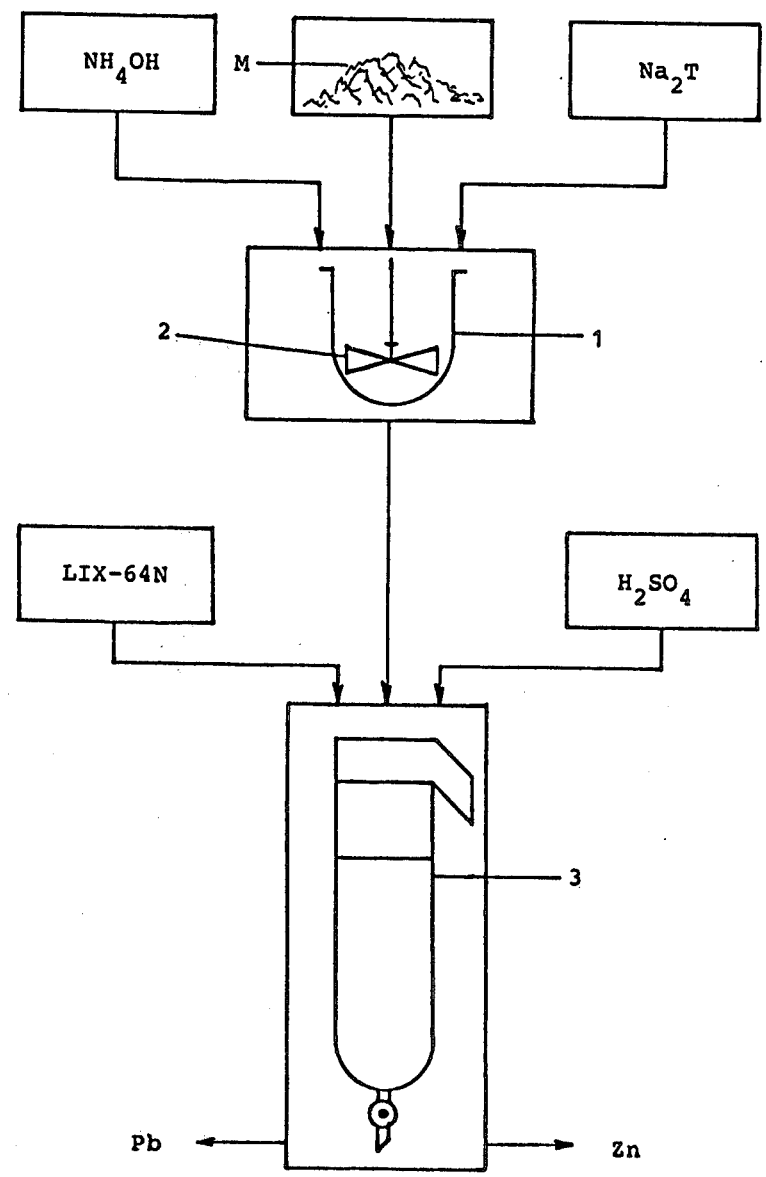
FIG. 1 is a flow-sheet of the process in accordance with the invention.
Figure 2:
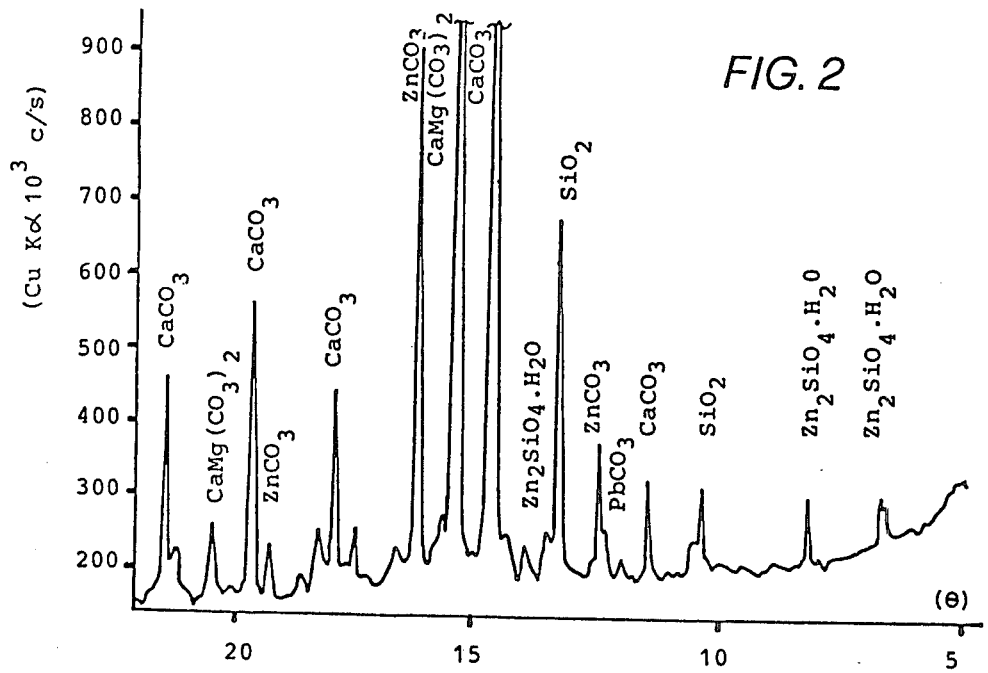
FIG. 2 is a diffractogram of the ore utilized in the experimental example of the process of the invention.

The Pb is then recovered from the organic phase, according to known systems, as for instance by acid stripping and subsequent electrolysis, whereas the zinc is precipitated through the heating of the waterly phase. The $NH_3$ is thus recovered and reintroduced into the process. The following example will still further illustrate the present invention:

the ore employed (raw-ore), came from the mines of Masua (Sardinia-Italy). The diffractograms of the ore, given in FIG. 2, shows the presence of smithsonite, cerussite and emimorphyte, the latter in smaller quantities. The gauge substantially consisted of partially dolomitic limestone.

The granulometric composition and the Pb and Zn content of the ore, are given in the following table:

| Mesh | Weight % | Content % Zn | Content % Pb | Distribution % Zn | Distribution % Pb |
|---|---|---|---|---|---|
| + 14 | 3.8 | 3.56 | 0.70 | 2.0 | 1.7 |
| + 32 | 19.7 | 5.80 | 1.04 | 17.4 | 13.1 |
| + 65 | 23.6 | 8.08 | 1.83 | 29.1 | 27.5 |
| +100 | 7.3 | 8.52 | 2.15 | 9.5 | 10.0 |
| +170 | 7.6 | 9.20 | 2.29 | 10.7 | 11.1 |
| −170 | 38.0 | 5.40 | 1.51 | 31.3 | 36.6 |
|  | 100.0 | 6.56 | 1.57 | 100.0 | 100.0 |

The leaching took place in a SOVIREL glass reaction tank, into which a quantity of ore was introduced, corresponding to 500 gr of dry substance together with one liter of ammoniacal waterly solution (28° Be) and sodium tartrate ($Na_2T$).

Several leaching tests were carried out with an $NH_3$ concentration varying from 180 to 240 g/l and with a sodium tartrate concentration carrying from 60 g to 240 g/l. After four hours each leaching was stopped as no further notable dissolving of Zn and Pb had been observed. The pH of the solution was set at 12.1 as preliminary tests had shown that the highest recovery of Pb and Zn were obtained with such a pH level.

Figure 3:
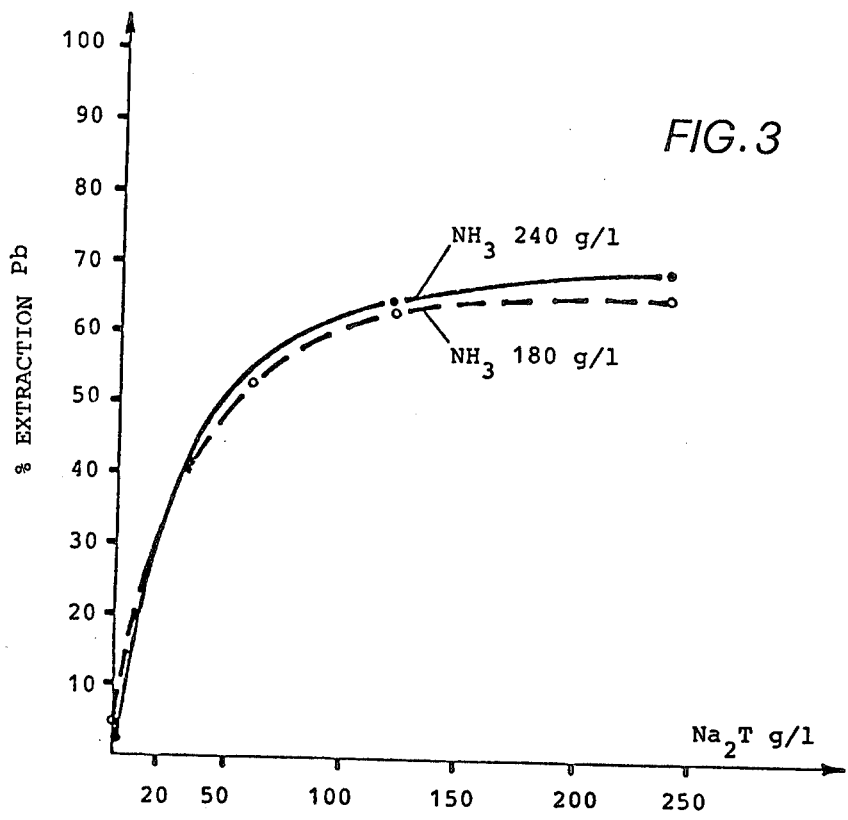
FIG. 3 illustrates the Pb solubility curve, related to the concentration of sodium tantrate, during the ammoniacal leaching stage of the process of the invention.

The curves of FIGS. 3 and 4 indicate that:
the Pb solubility is higher, when the $Na_2T$ concentration increases, and reaches a maximum of about 70 for a concentration of $Na_2T$ of 240 g/l;
the Zn solubility is not affected by the presence of $Na_2T$.

To further underline the influence of $Na_2T$ on the Pb solubility in the ammoniacal solution, leaching tests were carried out, under the same conditions, but at various ammonia concentrations. FIG. 5 gives the trend of the solubility of both metals under such conditions.

The aqueous ammonia solution was then filtered and introduced into a glass extractor of 250 ml provided with four baffles set at 90° from each other. The pH of the water phase was brought to vary from 9.5 to 12.1, by the addition of $H_2SO_4$. The ratio of the water phase/organic phase was kept to 1:1. The mixing of the two phases was carried out at a speed of 250 r.p.m. for 10 minutes. In all cases the separation of the two phases took place in a quick and clear manner.

After a 10 minutes decanting the two phases were unloaded through a tap from the bottom of the extractor. The Pb and Zn were then analyzed in the water phase, whereas the recoveries in the organic phase were obtained by subtraction with reference to the initial Pb and Zn concentration in the feeding solution.

The test results are given in FIG. 6: from it it may be observed that for a pH value around 9.5, the best selectivity of the two metals is obtained with a Pb recovery higher than 90%.

We claim:
1. A hydrometallurgical process for selectively separating lead and zinc from oxidized ore, comprising the steps of leaching said ore with an aqueous ammoniacal solution having a pH value of from between about 11.5 and 12.5 and in the presence of anions of polycarboxylic acids, and subsequently selectively extracting said lead with complex-producing solvents used in the ammoniacal solution at a pH value higher than about 9, the zinc being subsequently precipitated through the heating of the aqueous zinc-bearing solution.

2. The process according to claim 1 wherein the carboxylic anion employed is the tartrate ion.

3. The process according to claims 1 or 2 wherein sodium tartrate, $Na_2T$, is added to the ammoniacal solution.

4. The process according to claim 3 wherein said ammoniacal leaching takes place at a temperature not higher than about 50° C.

5. The process according to claim 4 wherein said ammoniacal leaching takes place at a temperature not higher than about 50° C.

6. The process according to claim 5 wherein said ammoniacal leaching takes place at a temperature not higher than about 50° C.

7. The process according to claim 6 wherein said ammoniacal leaching takes place at a temperature not higher than about 50° C.

8. The process according to claims 1 or 2 wherein $Na_2T$ is added to the ammoniacal solution, in a concentration higher than about 100 g/l.

9. The process according to claim 3 wherein $Na_2T$ is added to the ammoniacal solution, in a concentration higher than about 100 g/l.

10. The process according to claim 1 wherein the citric ion, is employed as the anion of polycarboxylic acid.

11. The process according to claims 1 or 10 wherein the ammoniacal leaching is carried out in a basic environment having a pH value (preferably) of about 12.1.

12. The process according to claim 1 wherein a Pb complex-producing solvent, with respect to Zn, LIX-64N is used in the ammoniacal solution.

13. A process according to claim 12 wherein the selective extraction of Pb takes place in a basic environment at a pH=9.5.

14. The process according to claims 1 or 2 wherein said ammoniacal leaching takes place at a temperature not higher than about 50° C.

15. A process according to claim 1 wherein the selective extraction of Pb in the organic phase takes place in a basic environment, at a pH=9.5.

* * * * *